Jan. 14, 1969  O. BAECHLER  3,421,741
DOUGH PREPARING AND MIXING MACHINES
Filed May 4, 1967
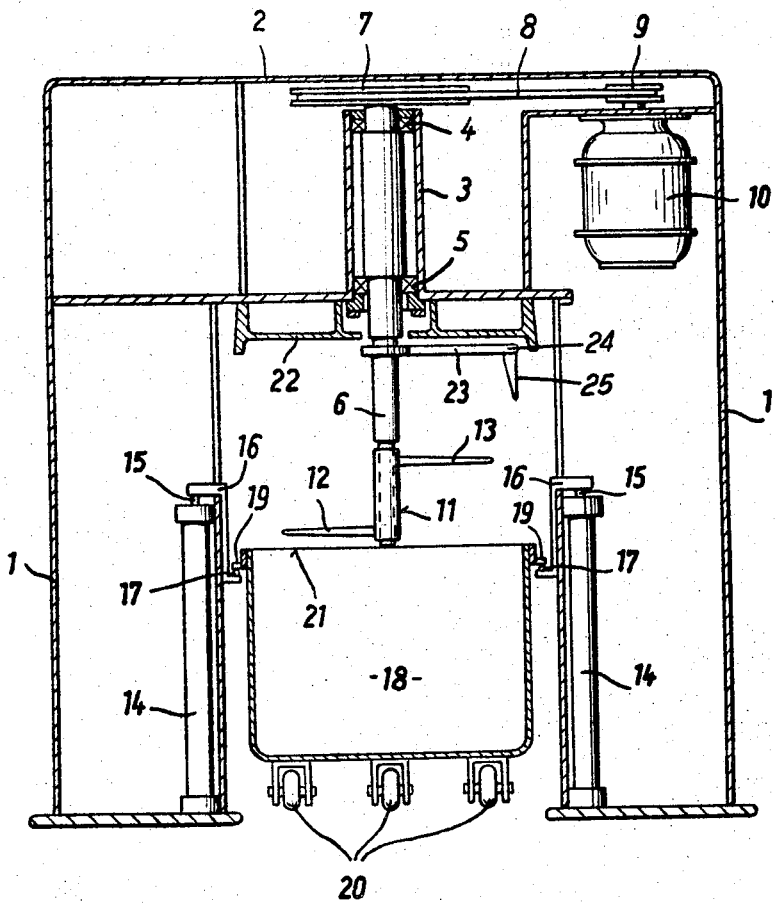
INVENTOR
Oswald Baechler
BY Harness, Dickey-Pierce
ATTORNEYS

United States Patent Office 3,421,741
Patented Jan. 14, 1969

3,421,741
DOUGH PREPARING AND MIXING MACHINES
Oswald Baechler, Burgstrasse 1, Rothenburg, Switzerland
Filed May 4, 1967, Ser. No. 636,180
Claims priority, application Switzerland, May 6, 1966, 6,655/66
U.S. Cl. 259—108
Int. Cl. B01f 7/20
7 Claims

ABSTRACT OF THE DISCLOSURE

A dough preparing and mixing machine comprises a gantry frame with a working shaft extending downwardly from the bridge thereof into a non-rotatable mixture container. The shaft has radially extending mixing vanes at its lower end. The container may be raised and lowered by synchronized pneumatic jacks fitted in the gantry columns.

---

The present invention relates to a dough preparing and mixing machine having a motor-driven working shaft with mixing arms located thereon, and having a mixture container which is non-rotatable in the working position.

Hitherto, machines for kneading dough were used in which, as a rule, two shear-like arms operating towards each other kneaded the dough located in the mixture container, kneading times of 15 to 30 minutes being usual, and the dough obtained being turned out in a glutinous state. The dough thus obtained usually had to stand for 60 to 90 minutes, this time being known among experts as the so-called "rising," "dwelling" time.

So-called rapid kneaders are already known in which kneading times of about 15 minutes may be taken into account. In these kneaders, the kneading arms knead the dough by rubbing it up and down the wall of the mixture container, in a similar manner to the movements when kneading manually.

Surprisingly, it has now been discovered that a dry dough may be obtained when quantities of water are used which are equal to or in excess of the quantities used in previous kneading machines, the dough requiring practically no "rising" time if a dough preparing and mixing machine is used which fulfills specific prerequisites.

According to the present invention, a dough preparing and mixing machine comprises a motor-driven working shaft rotatable about a vertical axis, a mixture container, the working shaft being journalled in a frame and extending downwardly from the frame in the direction of the mixture container, and at least one mixing vane secured to the working shaft for moving the material to be mixed from the bottom to the top of the mixture container when the shaft is rotating, the mixture container being provided with lifting means for raising the container to the working position, in which it can be fixed and secured from turning, and lowering the container to a position at which its upper rim is located lower than the lower end of the working shaft and the mixing vanes thereon.

Advantageously, the frame is constructed in the form of an inverted U-shaped gantry having lifting means, by which the container may be raised or lowered, provided in its two vertical members. Preferably, a lid for the mixture container is provided around the upper part of the working shaft and supported against the frame, the lifting means holding the upper rim of the mixture container against the lid so that the material to be mixed is not whirled out of the container when the mixing vanes rotate with the shaft. A scraper may be arranged on the shaft directly below the lid, so that, when the shaft is rotating, the scraper wipes the underside of the lid and returns into the container any mixture material adhering thereto. If an extension extending substantially downwards is attached to a scraper of this kind, or if the scraper is constructed with such an extension, mixture material adhering to the inner wall of the mixture container may be scraped therefrom and conveyed towards the centre of the container.

It is particularly advantageous if the mixture container itself has trolley wheels on which it may be wheeled out in the lowered position, since it is thus possible to use a plurality of mixture containers in succession and to transport the dough by the mobile mixture container for further processing.

Since the container may be of extremely simple construction, since it is not moved in the working position (as is generally the case with the conventional machines of today), it may be constructed relatively cheaply, so that a large number of mixture containers may be provided for one machine, and the productivity of the machine greatly increased by rapidly interchanging the containers.

The invention will be further described, by way of example, with reference to the accompanying drawing which is a vertical section through the frame and the mixture container of a dough preparing and mixing machine constructed in accordance with the invention.

Referring to the drawing, a horizontal connecting bridge 2 rests on two columns 1 to form a gantry-like frame. A bearing tube 3 having an upper ball bearing 4 and a lower ball bearing 5 for a working shaft 6 is provided in the centre of the bridge 2. A grooved belt pulley 7 driven by a grooved belt pulley 7 of the motor 10 via a V-belt 8 is secured to the upper end of the working shaft 6 journaled in this manner. A lower mixing blade 12 and an upper mixing blade 13 staggered with respect to height and projecting in the opposite direction thereto are secured to a sleeve 11 which is drawn on to the lower end of the working shaft in a manner precluding turning and is retained thereon by a screw (not illustrated) for example. As may be seen from the drawing, the upper faces of the mixing blades 12 and 13 slope slightly downwards away from the sleeve 11. For the sake of clarity, it is not illustrated that the mixing blades have a propeller-like pitch angle. When the shaft 6 with the sleeve 11 and the mixing blades 12, 13 are rotated, and the mixture container is in the working position, the material to be mixed, a dough for example, is conveyed from the bottom of the container towards the top by the blades and is also deformed in the radial direction and the direction of rotation, i.e. kneaded.

The columns 1 accommodate pneumatic cylinders 14 whose piston rods 15 are in engagement with crank-like, angled lifting hooks 16. A locating pin 17 on the lower horizontal part of each of the lifting hooks 16 engages into a corresponding recess in lugs 19 secured to both sides of the mixture container 18, when the mixing container 18 is to be raised into the working position from the lowered position illustrated. Three trolley wheels 20 are journalled to the bottom of the mixture container 18 and enable it to be wheeled out, in the illustrated lowered position, between the columns 1 from below the sleeve 11.

When compressed air is introduced into the pneumatic cylinders 14 via pipes (not illustrated), the piston rod 15 and the lifting hooks 16 are raised, the pins 17 engage into the lugs 19, and the mixture container 18 is likewise raised. This lifting movement continues until the upper rim 21 of the mixture container 18 abuts against a lid 22 extending concentrically around the shaft 6 and securely arranged on the bridge 2. The mixing process can now commence. It generally lasts for two or three minutes, five at the most, when manufacturing a dry dough which is further processed without "dwelling" time.

A scraper blade 23 is secured to the shaft 6 and wipes the underside of the lid 22 when the shaft 6 rotates, in order to scrape off any mixture material adhering to the lid 22. An extension 25 may extend substantially vertically downwardly from the outer end 24 of the scraper blade 23. Any mixture material adhering to the inner wall of the mixture container 18 will be scraped off by the extension 25 simultaneously with the operation of the scraper blade 23.

Other lifting devices may be used instead of the pneumatic cylinders. The form of the mixing vanes, the mixture container, the lid, the entire machine in general, and the method of driving the shaft 6, may be adapted to any particular requirements within the scope of the invention.

The mixing time of two to five minutes already mentioned for obtaining dry doughs are intended for a hundred litre mixture container which may be loaded up to 80%, wherein 10% more water than in conventional machines may be handled, so that, in a machine constructed in accordance with the invention, a dry dough is always obtainable without "dwelling" time.

I claim:

1. A dough preparing and mixing machine comprising frame means defining an opening adapted to receive a mixture container containing dough, a mixing shaft supported for rotation about a vertical axis by said frame means and extending into said opening, drive means for rotating said mixing shaft, at least one radially projecting mixing blade fixed to the lower end of said mixing shaft, and means carried by said frame means for supporting the mixture container within said opening and beneath said mixing shaft and for raising and lowering the container between a lowered position in which the container is disposed with its upper rim below the lower end of the mixing shaft and a raised mixing position wherein said mixing blade is positioned in the container adjacent the lower wall of the container, said mixing blade having a pitch for conveying dough from the bottom of the container toward the top of the container and for deforming the dough in a radial direction relative to the axis of rotation of said mixing shaft and in the direction of rotation of said blade for kneading the dough upon rotation of said blade.

2. A dough preparing and mixing machine as set forth in claim 1 further including a second mixing blade affixed to the mixing shaft at a point spaced from and above the first mentioned mixing blade, the second mixing blade having a pitch for conveying dough upwardly within the container and for deforming the dough in a radial direction relative to the axis of rotation of said mixing shaft and in the direction of rotation of said blade for kneading the dough upon rotation of said blade.

3. A dough preparing and mixing machine as set forth in claim 1 further including a lid fixed relative to the frame means concentrically with the mixing shaft and adapted to engage the upper rim of the container when the container is in its raised mixing position for forming a closure for the container.

4. A dough preparing and mixing machine as set forth in claim 3 further including a radially extending scraper blade fixed to the mixing shaft adjacent and beneath the lid for scraping dough from the lid.

5. A dough preparing and mixing machine as set forth in claim 4 wherein the scraper blade further includes a vertically downwardly extending portion adapted to engage the upper portion of the side wall of the container for scraping dough from the wall.

6. A dough preparing and mixing machine as set forth in claim 1 wherein the frame means is comprised of spaced vertically extending columns and a bridge spanning said columns, said columns and said bridge defining the container receiving opening, the means for raising and lowering the container comprising a pair of synchronized lifting devices each carried by a respective of said columns, the shaft being journalled in said bridge.

7. A dough preparing and mixing machine as set forth in claim 6 wherein each of the lifting devices comprises a hydraulically operated cylinder.

References Cited

UNITED STATES PATENTS

| | | | |
|---|---|---|---|
| 3,046,812 | 7/1962 | Beaman | 259—102 X |
| 3,151,847 | 10/1964 | Broomall | 259—102 X |
| 3,201,095 | 8/1965 | Erwien | 259—108 |
| 3,263,970 | 8/1966 | Steinbock | 259—122 X |

ROBERT W. JENKINS, *Primary Examiner.*